(12) United States Patent
De Monte et al.

(10) Patent No.: US 12,123,331 B2
(45) Date of Patent: Oct. 22, 2024

(54) METHOD FOR OPERATING A PARTICLE FILTER TAKING THE ASH QUANTITY INTO CONSIDERATION

(71) Applicant: AVL List GmbH, Graz (AT)

(72) Inventors: Mario De Monte, Birkfeld (AT); Klaus Hadl, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 18/267,790

(22) PCT Filed: Dec. 15, 2021

(86) PCT No.: PCT/AT2021/060479
§ 371 (c)(1),
(2) Date: Jun. 16, 2023

(87) PCT Pub. No.: WO2022/126170
PCT Pub. Date: Jun. 23, 2022

(65) Prior Publication Data
US 2024/0093625 A1    Mar. 21, 2024

(30) Foreign Application Priority Data
Dec. 16, 2020   (AT) .............................. A 51099/2020

(51) Int. Cl.
*F01N 11/00*   (2006.01)
*G07C 5/00*   (2006.01)
(52) U.S. Cl.
CPC ............ *F01N 11/002* (2013.01); *G07C 5/006* (2013.01); *F01N 2550/04* (2013.01)
(58) Field of Classification Search
CPC .... G07C 5/006; F01N 2250/04; F01N 11/002
See application file for complete search history.

(56) References Cited

U.S. PATENT DOCUMENTS

2006/0005534 A1   1/2006   Wirth
2012/0047876 A1*  3/2012   Youn ...................... F01N 9/002
                                                                    60/274

FOREIGN PATENT DOCUMENTS

DE   102004033412    2/2006
DE   602004001154   10/2006
(Continued)

OTHER PUBLICATIONS

Internationaler Recherchenbericht und Schriftlicher Bescheid [International Search Report and the Written Opinion] Dated Mar. 31, 2022 From the International Searching Authority Re. Application No. PCT/AT2021/060479 and Its Translation of Search Report Into English. (13 Pages).

*Primary Examiner* — Kevin A Lathers

(57) ABSTRACT

The invention relates to a method for operating a particulate filter (3) taking the ash loading into consideration, to an arrangement in this respect, to a control unit in this respect, and to a vehicle in this respect, wherein, during the operation of the internal combustion engine (1), fuel and/or lubricants are at least partially converted into ash by the internal combustion engine (1), wherein a first ash value is calculated on the basis of the fuel consumption and/or the lubricant consumption of the internal combustion engine (1), wherein, after regeneration of the particulate filter, the differential pressure across the particulate filter (3) is determined, wherein a second ash value is calculated on the basis of the determined differential pressure, wherein the ash quantity in the particulate filter (3) is determined from the first and the second ash value, and wherein, if the determined ash quantity exceeds a predefined value, a status device is activated.

15 Claims, 2 Drawing Sheets

(56) References Cited

FOREIGN PATENT DOCUMENTS

| DE | 102015117473 | 11/2016 |
|----|--------------|---------|
| DE | 112016004177 | 5/2018 |
| EP | 1467071 | 10/2004 |
| WO | WO 2010/062872 | 6/2010 |
| WO | WO 2022/126170 | 6/2022 |

* cited by examiner

METHOD FOR OPERATING A PARTICLE FILTER TAKING THE ASH QUANTITY INTO CONSIDERATION

RELATED APPLICATIONS

This application is a National Phase of PCT Patent Application No. PCT/AT2021/060479 having International filing date of Dec. 15, 2021, which claims the benefit of priority of Austria Patent Application No. A51099/2020 filed on Dec. 16, 2020. The contents of the above applications are all incorporated by reference as if fully set forth herein in their entirety.

FIELD AND BACKGROUND OF THE INVENTION

The invention relates to a method according to the preamble of the independent claim 1. The invention also relates to an arrangement and a control unit which are configured to carry out the method according to the invention. In addition, the invention relates to a vehicle including the arrangement according to the invention.

Different methods for determining the ash quantity in a particulate filter are known from the prior art. For example, methods are known in which the ash quantity in the particulate filter is calculated exclusively via the differential pressure. However, a disadvantage of these methods is that the ash quantity can only be detected, if at all, after active regeneration.

Summary of the Invention

The object of the invention is to overcome the disadvantages of the prior art. In particular, it is the object of the invention to create a method for operating a particulate filter taking the ash quantity in the particulate filter into consideration. In addition, the method should make it possible to determine the ash quantity in the particulate filter simply and reliably.

The problem according to the invention is in particular solved by the features of the independent claims.

In particular, the invention relates to a method for operating a particulate filter taking the ash quantity in a particulate filter into consideration and/or for determining the ash quantity in a particulate filter of an exhaust gas aftertreatment system of an internal combustion engine.

In particular, during the operation of the internal combustion engine, lubricants from the internal combustion engine and/or fuel are at least partially converted to ash.

If necessary, an initial ash value is calculated on the basis of the fuel and/or lubricant consumption of the internal combustion engine.

Preferably, following a regeneration of the particulate filter, the differential pressure of the particulate filter is determined, in particular across the particulate filter, and a second ash value is calculated on the basis of the determined differential pressure. Particularly preferably, one differential pressure per exhaust gas volume flow is always determined and calculated, a second ash value being determined from this.

Preferably, the ash quantity in the particulate filter is determined from the first and the second ash value.

Particularly preferably, a status device, in particular an engine malfunction indicator light, is activated when the determined ash quantity exceeds a predefined value, as a result of which the driver may be informed about the condition of their exhaust gas aftertreatment system, in particular the condition of the particulate filter. In particular, the status device can also be designed as a service indicator.

In particular, the ash quantity, in particular the ash loading, of the particulate filter can be determined in grams using the method according to the invention.

If necessary, the effective volume of the particulate filter can be calculated according to the following rule:

$$V_{\mathit{eff}} = V_{PF} - V_{Ash}$$

where $V_{\mathit{eff}}$ is the effective volume of the particulate filter, $V_{PF}$ is the volume of the particulate filter and $V_{Ash}$ is the volume of ash in the particulate filter. The volume of ash can be determined from the ash quantity.

By using the $V_{\mathit{eff}}$, a soot loading of the filter can be stated in grams per litre of effective volume. This has the advantage that measures relating to thermal management can always be triggered at a certain relative soot loading, even though the effective volume and the absolute soot loading are reduced.

The particulate filter can preferably be a diesel particulate filter, a so-called DPF, or a petrol particulate filter, a so-called PPF or GPF.

The first ash value can be determined, in particular exclusively, on the basis of the operating point of the internal combustion engine, preferably continuously.

The first ash value can be determined, in particular exclusively, on the basis of measurement data from the internal combustion engine, preferably continuously.

The first ash value can be determined, in particular exclusively, on the basis of the engine oil used in the internal combustion engine and/or the fuel consumption of the internal combustion engine, preferably continuously.

Optionally, a so-called first ash collection factor may be taken into consideration when determining the first ash value. The exhaust gas mass flow and/or the exhaust gas volume flow and/or the exhaust gas temperature may be taken into consideration when determining the first ash collection factor.

The second ash value can be determined, in particular exclusively, on the basis of the determined differential pressure of the particulate filter, in particular the differential pressure across the particulate filter. Particularly preferably, the second ash value is determined on the basis of the differential pressure and the exhaust gas volume flow. A so-called flow resistance is determined from a ratio between differential pressure and exhaust gas volume flow (dP/exhaust gas volume flow), which is proportional to a soot loading. Thus, the soot loading is determined in a simple manner.

Optionally, a so-called second ash collection factor may be taken into consideration when determining the second ash value. Optionally, the exhaust gas volume flow and/or the exhaust gas temperature may be taken into consideration when determining the second ash collection factor.

Optionally, the first and second ash collection factors may be identical.

The ash quantity in the particulate filter can be determined taking into consideration the first ash value calculated [on the basis of the] fuel and/or lubricant consumption of the internal combustion engine and the second ash value determined on the basis of the differential pressure, particularly preferably the ash value determined on the basis of the differential pressure per exhaust gas volume flow.

Optionally, a status device, specifically an engine malfunction indicator light, is activated if the determined ash quantity in the particulate filter exceeds a predefined value. This allows the driver to be informed about the condition of the exhaust gas aftertreatment system, in particular the condition of the particulate filter.

Optionally, no status device, in particular no engine malfunction indicator light, is activated if the determined ash quantity in the particulate filter falls below a predefined value or corresponds to this predefined value.

Optionally, status information on the function of the exhaust gas aftertreatment system may be output by means of the status device, in particular the engine malfunction indicator light of a vehicle—a so-called MIL—as a result of which the driver is informed of the status of the functionality of the exhaust gas aftertreatment system, in particular the functionality of the particulate filter.

Optionally, the status information regarding the function of the exhaust gas aftertreatment system may be output by means of information provided by a warning light and/or an message on a display of a vehicle and/or an acoustic message, as a result of which the driver is informed of the status of the functionality of the exhaust gas aftertreatment system, in particular the functionality of the particulate filter.

Optionally, the status device may be a warning light, specifically an engine malfunction indicator light. Optionally, the status device can output a message on a display of a vehicle and/or as an acoustic message.

The internal combustion engine can be a combustion engine of a motor vehicle, in particular a diesel engine or a petrol engine.

Optionally, the method steps of the method may follow each other in the sequence described above.

However, the specified semantic order may not necessarily correspond to the chronological order.

The method steps can be carried out once, never, or also several times during the operation of a vehicle.

In all embodiments, it is preferably the case that the method according to the invention is automated, in particular controlled and/or regulated by a control unit of the motor vehicle.

With the method according to the invention, it can be possible to determine the function of the particulate filter, in particular the effective volume of the particulate filter. In the context of the present invention, the effective volume of the particulate filter can be understood as the volume which is free of ash. In other words, the effective volume may be available for the filtration of soot and/or ash.

In the context of the invention, the determination of the differential pressure of the particulate filter can be understood to mean the determination of the differential pressure across the particulate filter. In other words, the differential pressure of the particulate filter or the differential pressure across the particulate filter can be determined by determining the pressure, in particular the pressure difference, before and after the particulate filter. Particularly preferably, one differential pressure per exhaust gas volume flow is always determined and calculated.

Optionally, the differential pressure across the particulate filter may be determined if the soot loading in the particulate filter is substantially zero. Particularly preferably, the differential pressure per exhaust gas volume flow is determined across the particulate filter if the soot loading in the particulate filter is substantially zero.

Optionally, the differential pressure across the particulate filter may be determined if the particulate filter is substantially free of soot. Particularly preferably, the differential pressure per exhaust gas volume flow is determined across the particulate filter if the particulate filter is substantially free of soot.

Optionally, the second ash value may be determined by means of a differential pressure measurement across the particulate filter. In particular, the second ash value is determined if the particulate filter is free of soot. The differential pressure measurement is in particular a differential pressure measurement per exhaust gas volume flow, for which purpose a differential pressure determination unit is in particular provided.

In particular, the second ash value is determined if the exhaust gas mass flow is in the range of 100 kg/h up to and including 2000 kg/h.

Optionally, the second ash value may be determined based on the differential pressure over the particulate filter in operating points of the particulate filter, in particular after regeneration of the particulate filter, if the differential pressure corresponds to the ash quantity in the particulate filter. In particular, here again, a differential pressure per exhaust gas volume flow is determined.

Optionally, the second ash value may be determined if the ash quantity in the particulate filter can be determined via the measured differential pressure.

Optionally, the differential pressure across the particulate filter may be determined if the exhaust gas mass flow is in the range of 100 kg/h to 2000 kg/h, in particular in the range of 500 kg/h up to and including 1000 kg/h. Basically, these values depend on a filter resistance and can vary accordingly.

Optionally, the exhaust gas aftertreatment system may include several exhaust gas aftertreatment components, such as, in particular, a three-way catalytic converter, a diesel oxidation catalyst, the particulate filter, an NOx storage catalyst, a catalyst for the selective reduction of nitrogen oxides and/or an ammonia slip catalyst.

Optionally, the exhaust gas aftertreatment components, in particular the particulate filter, may be at least partially flowed through by the exhaust gas and/or ash emitted by the internal combustion engine.

Optionally, the first ash value may be calculated according to the following rule:

$$A_1 = A_{m1} \times F_1$$

wherein $A_1$ is the first ash value, $A_{m1}$ is the ash value calculated on the basis of the fuel and/or lubricant consumption and $F_1$ states the percentage of the calculated ash value which remains in the particulate filter.

In principle, the second ash value may be calculated according to the following rule:

$$A_2 = A_{m2} \times F_2$$

where $A_2$ is the second ash value, $A_{m2}$ is the ash value calculated on the basis of the pressure loss across the particulate filter and $F_2$ states the percentage of the calculated ash value which remains in the particulate filter.

However, it is advantageous if only the ash in the filter is measured when calculating the differential pressure, but not the raw ash from the engine. This means the ash value calculated on the basis of the pressure loss is already $A_2$, since only the ash that is in the filter can generate a differential pressure.

Optionally, a so-called ash collection factor, namely the value $F_1$ and/or $F_2$, may be taken into consideration when determining the first and/or second ash value.

Optionally, the exhaust gas volume flow and/or the exhaust gas temperature may be taken into consideration when determining the ash collection factor.

Optionally, the exhaust gas temperature, in particular after leaving the internal combustion engine and/or on entering the particulate filter, may be taken into consideration when calculating the first and/or second ash value. It is particularly advantageous if a temperature upstream of the particulate filter or a filter substrate temperature model is used for the calculation.

Optionally, the temperature of the particulate filter may be taken into consideration when calculating the first and/or second ash value.

Optionally, the regeneration of the particulate filter with oxygen takes place at a particulate filter temperature greater than 480° C., in particular greater than 580° C.

In particular, the invention relates to an arrangement, wherein the arrangement comprises an internal combustion engine and an exhaust gas aftertreatment system.

Optionally, the exhaust gas aftertreatment system includes at least one exhaust gas aftertreatment component, in particular a particulate filter.

Optionally, lubricant and/or fuel are at least partially converted to ash during operation of the internal combustion engine. It is thereby assumed that the lubricant has a greater influence on an ash quantity than the fuel.

Preferably, the arrangement is configured and/or designed to carry out the method according to the invention.

Optionally, the exhaust gas aftertreatment system may include a pressure measuring arrangement which is configured to measure the differential pressure of the particulate filter, in particular across the particulate filter. The differential pressure measurement is advantageously used to determine a differential pressure per exhaust gas volume flow.

Optionally, the, or a, pressure measuring arrangement comprises two pressure measuring devices, wherein the first pressure measuring device is arranged before the particulate filter and the second pressure measuring device is arranged after the particulate filter. The exhaust gas aftertreatment system also advantageously includes a diesel oxidation catalyst which is arranged upstream of the particulate filter, which is designed as a diesel particulate filter. It is thereby advantageous if the first pressure measuring device is arranged upstream of the diesel oxidation catalyst and the second pressure measuring device is arranged downstream of the particulate filter. The pressure measuring arrangement is advantageously designed and arranged to determine a differential pressure per exhaust gas volume flow.

The differential pressure across the particulate filter can be determined via the pressure measuring arrangement. In particular, the pressure measuring arrangement can be used to determine the pressure difference, in particular the differential pressure, before and after the particulate filter or, as described above, before and after the particulate filter and another exhaust gas aftertreatment device arranged upstream of the particulate filter.

In particular, the invention relates to a control unit for the exhaust gas aftertreatment system of an internal combustion engine.

Preferably, the control unit is configured to carry out the method according to the invention.

In particular, the invention relates to a vehicle, wherein the vehicle includes an arrangement according to the invention. Advantageously, the arrangement according to the invention can also be designed as a stationary system, or a stationary system can include a corresponding arrangement. For example, a stationary system can be designed as a generator.

Further features according to the invention are disclosed in the claims, the description of the exemplary embodiments and the figures.

BRIEF DESCRIPTION OF THE SEVERAL VIEWS OF THE DRAWINGS

The invention will now be further explained with reference to exemplary, non-exclusive and/or non-limiting exemplary embodiments.

DESCRIPTION OF SPECIFIC EMBODIMENTS OF THE INVENTION

Figure 1:
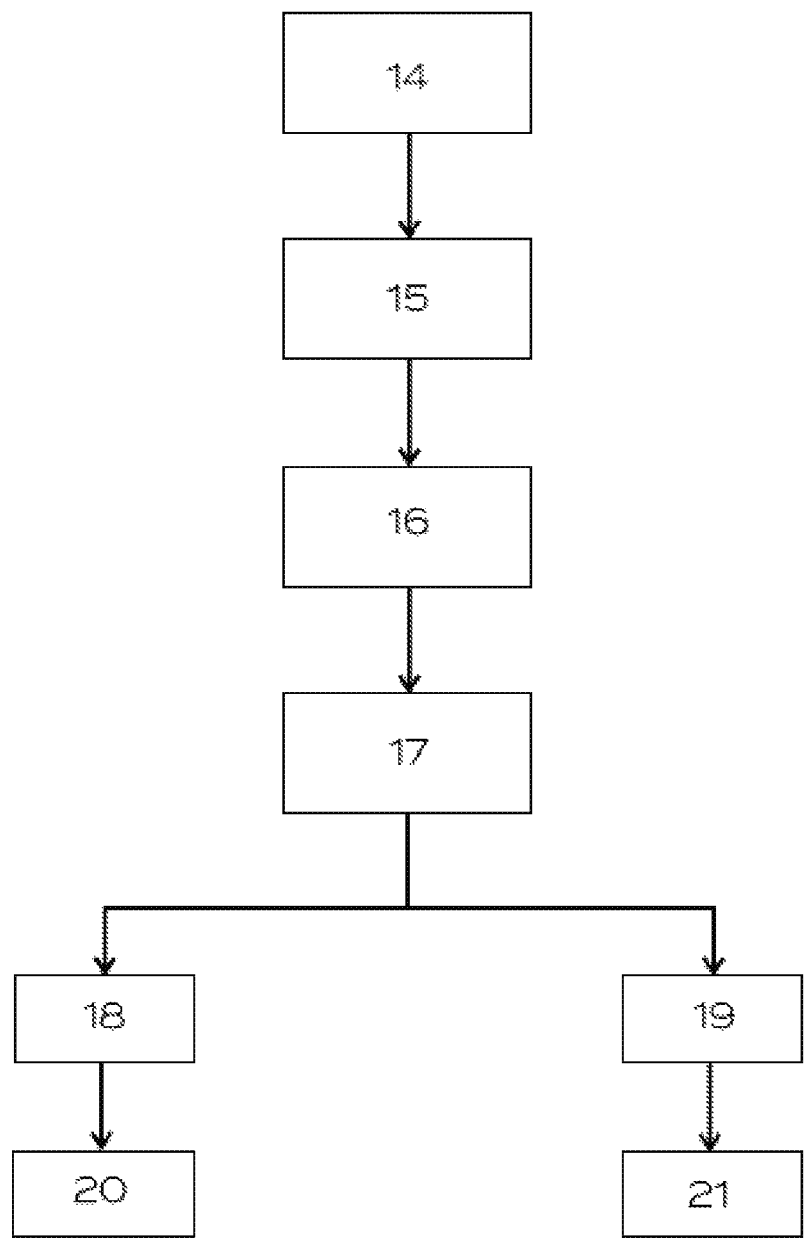
FIG. 1 shows a schematic graphic representation of a first embodiment of the method according to the invention.

Unless otherwise indicated, the reference signs correspond to the following components: Internal combustion engine 1, exhaust gas aftertreatment system 2, particulate filter 3, first pressure measuring device 4, second pressure measuring device 5, first temperature measuring device 6, HC doser 7, second temperature measuring device 8, first NOx measuring device 9, third temperature measuring device 10, AdBlue doser 11, fourth temperature measuring device 12, second NOx measuring device 13, calculation of the first ash value 14, regeneration of the particulate filter 15, calculation of the second ash value 16, determination of the ash quantity in the particulate filter taking into consideration the first and second ash values 17, determined ash quantity is less than the predefined limit 18, determined ash quantity is greater than the predefined limit 19, status device not activated 20, status device activated 21, diesel oxidation catalyst 22, SCR catalyst 23 and ammonia slip catalyst 24.

FIG. 1 shows a schematic graphic representation of a first embodiment of the method according to the invention for the operation of a particulate filter 3 taking into consideration the ash quantity in a particulate filter 3 and/or for the determination of the ash quantity in a particulate filter 3 of an exhaust gas aftertreatment system 2 of an internal combustion engine 1.

According to the first embodiment, during the operation of the internal combustion engine 1 fuel and/or lubricant is at least partially converted to ash. This ash then flows at least partially through the exhaust gas aftertreatment system 2 of the internal combustion engine 1, which includes a particulate filter 3.

A first ash value 14 is calculated on the basis of the fuel and/or lubricant consumption of the internal combustion engine 1.

According to this embodiment, the first ash value is calculated according to the following rule:

$$A_1 = A_{m1} \times F_1$$

where $A_1$ is the first ash value, $A_{m1}$ is the ash value calculated on the basis of the fuel and/or lubricant consumption and $F_1$ states what percentage of the calculated ash value remains in the particulate filter.

During the course of the method, the particulate filter is regenerated 15. The regeneration of the particulate filter 3 is carried out with oxygen at a particulate filter temperature greater than 480° C., in particular greater than 580° C. However, regeneration is not essential.

After regeneration, in particular immediately after regeneration, the differential pressure across the particulate filter 3 is determined and the second ash value is calculated on the basis of the differential pressure 16.

The differential pressure across the particulate filter 3 is determined according to this embodiment if the soot loading in the particulate filter 3 is substantially zero and/or if the particulate filter 3 is substantially free of soot. This allows the determined differential pressure to be used to infer the ash quantity, which is present in the particulate filter 3.

According to this embodiment, the second ash value is calculated according to the following rule:

$$A_2 = A_{m2} \times F_2$$

where $A_2$ is the second ash value, $A_{m2}$ is the ash value calculated on the basis of the pressure loss across the particulate filter and $F_2$ states the percentage of the calculated ash value which remains in the particulate filter 3.

Furthermore, according to this embodiment the differential pressure across the particulate filter 3 is determined if the exhaust gas mass flow is above 100 kg/h.

When calculating the first and second ash values, the exhaust gas temperature and/or the temperature of the particulate filter 3 are taken into consideration.

The ash quantity in the particulate filter is then determined from the first and second ash value 17.

If the determined ash quantity in the particulate filter is greater than a predefined value 19, a status device, in particular an engine malfunction indicator light, is activated 21, as a result of which the driver is informed of the condition of the exhaust gas aftertreatment system 2.

If the determined ash quantity in the particulate filter is less than the predefined value or corresponds to the predefined value 18, the status device, in particular the engine malfunction indicator light, is not activated 20.

Figure 2:
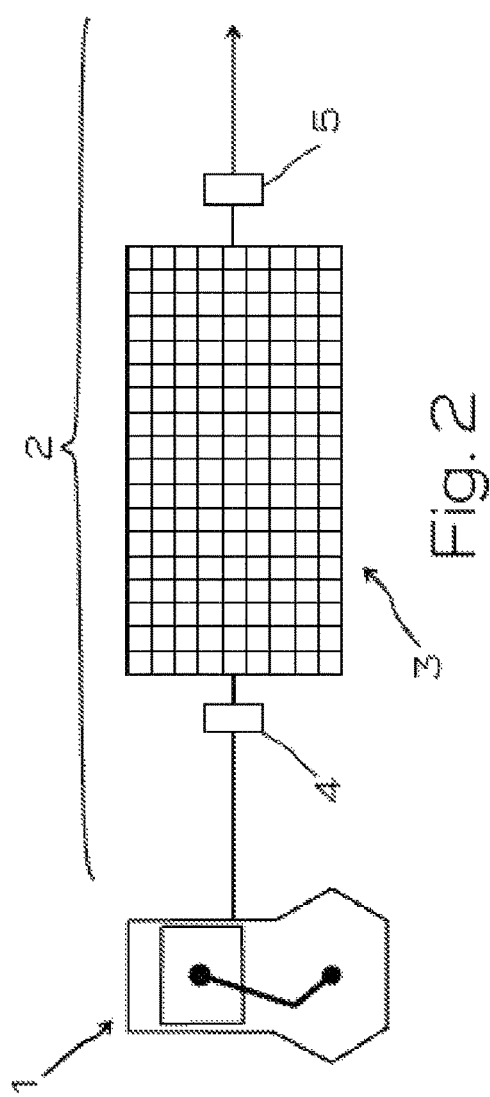
FIG. 2 shows a schematic graphic representation of a first embodiment of the arrangement according to the invention.

FIG. 2 shows a schematic graphic representation of a first embodiment of the arrangement according to the invention.

According to this embodiment, the arrangement includes an internal combustion engine 1 and an exhaust gas aftertreatment system 2. The exhaust gas aftertreatment system 2 includes a particulate filter 3.

During operation of the internal combustion engine 1, fuel and/or lubricant are at least partially converted to ash. This ash then flows through the exhaust gas aftertreatment system 2 and thus also through the particulate filter 3.

The arrangement according to the first embodiment is configured to carry out the method according to the invention. In particular, the method according to the invention is regulated and/or controlled by a control unit, not shown.

Furthermore, the arrangement includes a pressure measuring arrangement which is configured to measure the differential pressure across the particulate filter 3. The pressure measuring arrangement comprises two pressure measuring devices, wherein the first pressure measuring device 4 is arranged before the particulate filter 3 and the second pressure measuring device 5 is arranged after the particulate filter 3.

Optionally, the status information regarding the function of the exhaust gas aftertreatment system 2 may be output by means of a status device, in particular a MIL—malfunction indicator light—of a vehicle, a display and/or an acoustic message, as a result of which the driver is informed about the condition of the functionality of the exhaust gas aftertreatment system 2, in particular the functionality of the particulate filter 3.

Figure 3:
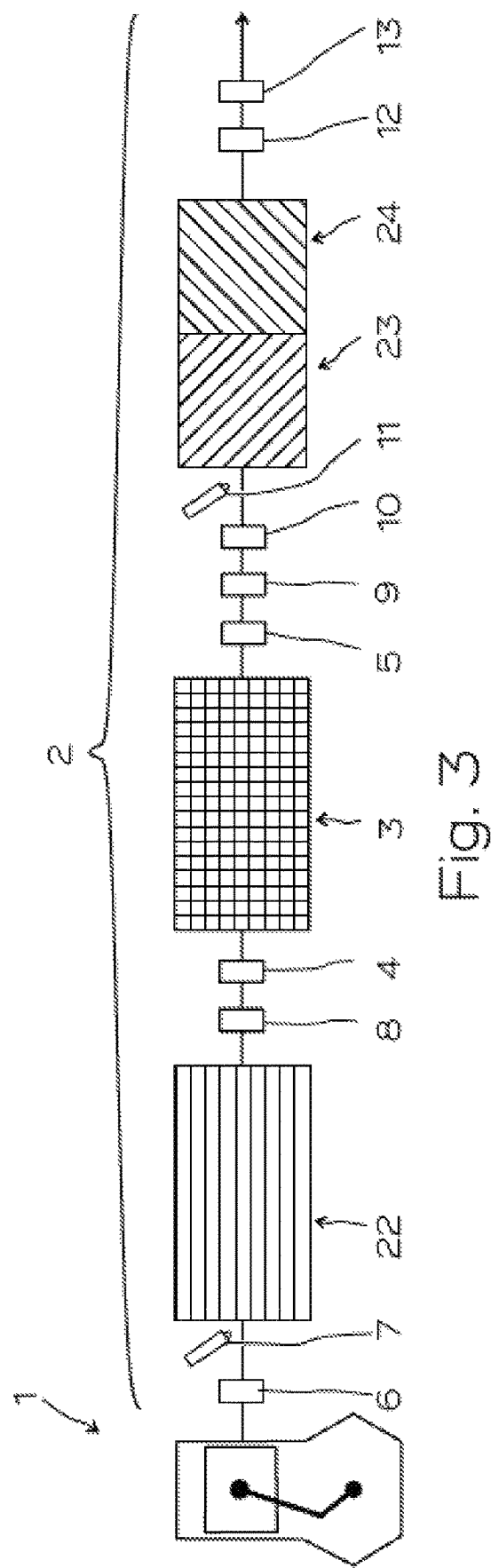
FIG. 3 shows a schematic graphic representation of a second embodiment of the arrangement according to the invention.

FIG. 3 shows a schematic graphic representation of a second embodiment of the arrangement according to the invention. The features of the second embodiment according to FIG. 3 may preferably correspond to the features of the first embodiment according to FIG. 2.

The arrangement according to the second embodiment is configured to carry out the method according to the invention. In particular, the method according to the invention is regulated and/or controlled by a control unit, not shown.

According to this embodiment, the arrangement includes an internal combustion engine 1 and an exhaust gas aftertreatment system 2.

According to this embodiment, the exhaust gas aftertreatment system 2 comprises a diesel oxidation catalyst 22, a so-called DOC, a diesel particulate filter, a so-called DPF, a catalytic converter which is configured for the selective reduction of nitrogen oxides, a so-called SCR catalyst 23 and an ammonia slip catalyst 24, a so-called ASC.

A first temperature measuring device 6 and a so-called HC doser 7 are arranged between the internal combustion engine 1 and the diesel oxidation catalyst 22.

A second temperature device 8 and a first pressure measuring device 4 are arranged between the diesel oxidation catalyst 22 and the diesel particulate filter.

A second pressure measuring device 5, a first NOx measuring device 9, a third temperature measuring device 10 and a so-called AdBlue doser 11 are arranged between the diesel particulate filter and the SCR catalyst 23.

The ammonia slip catalyst 24 is arranged after the SCR catalyst 23. A fourth temperature measuring device 12 and a second NOx measuring device 13 are arranged after the ammonia slip catalyst 24.

According to this embodiment, the pressure measuring arrangement comprises the first and the second pressure measuring device 4, 5, which is configured to measure the differential pressure across the particulate filter 3.

The effects according to the invention can be achieved through this exemplary configuration.

The invention is not limited to the embodiments described, but includes any method, arrangement, control unit and vehicle according to the following claims.

The invention claimed is:

1. A method for operating a particulate filter taking the ash quantity into consideration and/or for determining the ash quantity in a particulate filter of an exhaust gas aftertreatment system of an internal combustion engine,
    wherein, during the operation of the internal combustion engine, lubricants from the internal combustion engine and/or fuel are at least partially converted into ash,
    and wherein a first ash value is calculated on the basis of the fuel and/or lubricant consumption of the internal combustion engine,
    wherein
    after regeneration of the particulate filter, the differential pressure across the particulate filter is determined,
    a second ash value is calculated on the basis of the determined differential pressure,
    the ash quantity in the particulate filter is determined from the first and the second ash value,
    and, when the determined ash quantity exceeds a predefined value, a status indicator is activated;
    wherein the exhaust gas temperature after leaving the internal combustion engine and on entering the particulate filter is taken into consideration when calculating the first and second ash value, wherein a temperature upstream of the particulate filter is used for the calculation; and wherein a filter substrate temperature model is used for the calculation.

2. The method according to claim 1, wherein the differential pressure across the particulate filter is determined
if the soot loading in the particulate filter is substantially zero,
and/or if the particulate filter is substantially free of soot.

3. The method according to claim 1, wherein the differential pressure across the particulate filter is determined when the exhaust mass flow is between 100 kg/h and 2000 kg/h.

4. The method of claim 3, wherein the exhaust mass flow is between 500 kg/h and 1000 kg/h.

5. The method according to claim 1, wherein
the exhaust gas aftertreatment system comprises several exhaust gas aftertreatment components.

6. The method of claim 5, wherein the several exhaust gas aftertreatment components comprises at least one of a three-way catalytic converter, a diesel oxidation catalyst, the particulate filter, an NOx storage catalyst, a catalyst for the selective reduction of nitrogen oxides and an ammonia slip catalyst.

7. The method of claim 5, wherein the several exhaust gas aftertreatment components are at least partially flowed through by the exhaust gas and/or ash emitted by the internal combustion engine.

8. The method according to claim 1, wherein the first ash value is calculated according to the following rule:

$$A_1 = A_{m1} \times F_1$$

where $A_1$ is the first ash value, $A_{m1}$ is the ash value calculated on the basis of the fuel and/or lubricant consumption and F1 is an ash collection factor and is determined based on exhaust gas volume flow and/or the exhaust gas temperature, wherein $F_1$ states the percentage of the calculated ash value which remains in the particulate filter.

9. The method according to claim 1, wherein
the temperature of the particulate filter is taken into consideration when calculating the first and/or second ash value.

10. An arrangement
wherein the arrangement comprises an internal combustion engine and an exhaust gas aftertreatment system,
wherein the exhaust gas aftertreatment system comprises at least one exhaust gas aftertreatment component,
and wherein fuel and/or lubricant are at least partially converted to ash during operation of the internal combustion engine,
wherein
the arrangement for carrying out the method is configured according to claim 1.

11. The arrangement according to claim 10, wherein the exhaust gas aftertreatment system includes a pressure measuring arrangement which is configured to measure the differential pressure of the particulate filter.

12. The method of claim 11, wherein the pressure measuring arrangement is configured to measure the differential pressure across the particulate filter.

13. A vehicle, wherein the vehicle includes an arrangement according to claim 10.

14. A control unit for the exhaust gas aftertreatment system of an internal combustion engine, wherein the control unit is configured to carry out the method according to claim 1.

15. The method of claim 1, wherein the status indicator is an engine malfunction indicator light.

* * * * *